Nov. 11, 1924.
G. A. FRAUENFELDER
PRESSURE GREASING DEVICE
Filed May 18, 1922
1,515,026
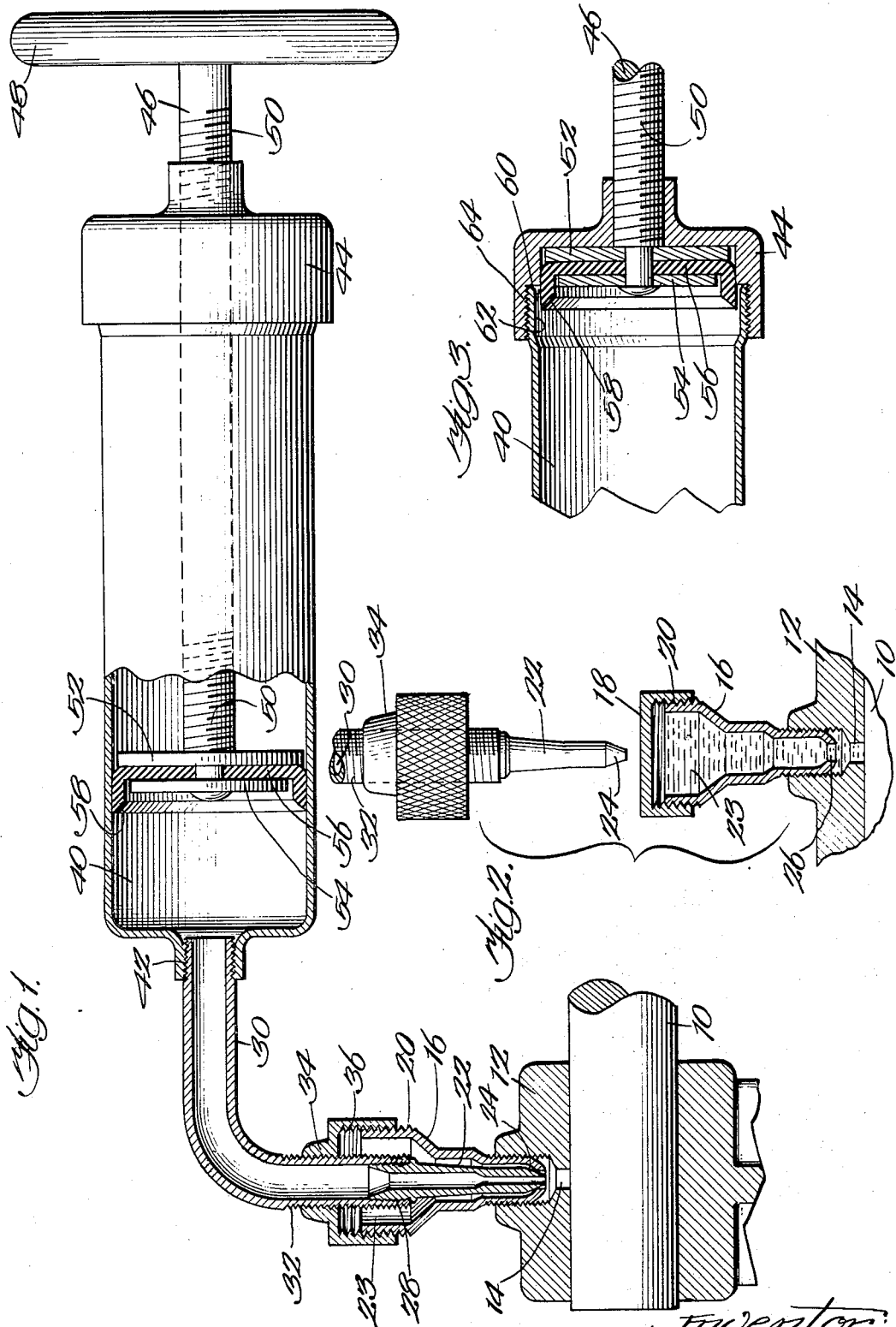
Inventor:
Gustav Adolph Frauenfelder
By Cheever & Cox Attys.

Patented Nov. 11, 1924.

1,515,026

UNITED STATES PATENT OFFICE.

GUSTAV ADOLF FRAUENFELDER, OF CHICAGO, ILLINOIS.

PRESSURE GREASING DEVICE.

Application filed May 18, 1922. Serial No. 561,984.

*To all whom it may concern:*

Be it known that I, GUSTAV ADOLF FRAUENFELDER, a citizen of the United States, residing at Chicago, in the county of Cook and State of Illinois, have invented a certain new and useful Improvement in Pressure Greasing Devices, of which the following is a specification.

In the machinery art and particularly in connection with automobiles, there are thousands of grease and oil cups attached to bearings of different kinds in which a supply of lubricant is retained with the expectation that it will be gradually fed to the bearing; but, it is essential in structures of this kind that the bearing, itself, be in fact thoroughly initially lubricated so that what lubricant is in the grease cup may be used simply as a reserve to keep the bearing in continued lubricated condition as long as any of the lubricating material is in the cup. In order to insure the initial thorough lubrication of the bearing, it is necessary to provide some sort of an apparatus which will force the lubricant to and about the bearing, notwithstanding the presence of the grease cup which usually occupies the only intake port for lubricant leading to the bearing. In order to avoid the necessity of removing the grease cup itself for the purpose of introducing lubricant under pressure directly to the bearing, the device of this invention has been developed for application to the bearing through the grease cup while in its normal position.

The object of the invention is to provide mechanism for this purpose which can be readily applied through the grease cup to the bearing at any angle to the axis of the grease cup which extraneous mechanisms surrounding the grease cup may dictate and in which, when so applied, the device is tightly secured in place so that no lubricant can escape as the pressure apparatus operates to force the lubricant into place in the bearing.

The further object of the invention is to construct a novel form of grease gun or pump which can be readily used for this purpose.

The invention consists in means for attaining the foregoing objects, which can be easily and cheaply made, which is satisfactory in use and is not readily liable to get out of order. More particularly, the invention consists in numerous features and details of construction which will be hereafter more fully set forth in the specification and claims.

Referring to the drawings in which like numerals designate the same parts throughout the several views:

Figure 1 is a sectional view of assembled mechanism ready to operate to force lubricant to a bearing.

Figure 2 is a detail view of the grease cup and the nozzle of the pressure greasing device of Figure 1, separated one from the other.

Figure 3 is a sectional detail view through the right hand end of the grease gun of Figure 1, showing the features of invention there located.

The invention is shown in the drawings as applied to a conventional form of shaft 10, presumably rotatable in correspondingly conventional bearing 12 to a port 14 in which a conventional grease cup 16 is screw threaded in the ordinary manner, said cup being in normal use adapted to be closed at its top by a screw threaded cap 18, engaging the side of the cup in screw threads 20.

In carrying out this invention, a grease delivery nozzle 22 is provided of a suitable size to enter the top of the grease cup 16, as shown in the drawing, and pass entirely through its interior chamber 23 until the lower tip 24 of the nozzle closely fits the discharge orifice 26 of the grease cup. This tip 24 is preferably made of angular form as shown so as to insure ready tight adjustment at almost any reasonable angle within the discharge port 26. The washer end of the nozzle is connected by any suitable means; as, for instance, the screw threads 28, with a supply pipe 30 of any suitable material, to which lubricant under pressure is supplied from any suitable source:—that shown in the drawing or otherwise. This pipe 30 is immediately adjacent to the nozzle 22 provided with external screw threads 32 on which travels a cap 34 replacing the cap 18 of the grease cup and provided with internal screw threads 36 adapted to engage the screw threads 20, heretofore referred to. That portion of the pipe 30 which includes the screw threads 32 should be of rigid material so that the operator can forcibly seat tip 24 of the nozzle 22 in register with discharge port 26 by either of two means, viz: rotating the nut 34 on the screw threads 20 or rotating the pipe 30 on the screw threads 32, the nut 34 remaining stationary. The screw threads 32 and the screw threads 20 should preferably be of different pitch so that by properly combining the two adjustments, just referred to, the nozzle may be brought in register with the bottom of the grease cup with the pipe 30, if rigid, extending at any desired angle radially from the vertical axis of the grease cup.

A specific means for supplying lubricant under pressure to the pipe 30 is shown in a novel form of grease gun, comprising a grease retaining cylinder 40, suitably connected as, for instance, by the screw threads 42 to the pipe 30 and closed at its opposite end by a cap 44 through which a piston rod 46, driven by hand wheel 48 is adapted to travel. In the particular case here illustrated, the motion of the rod 46 is determined by screw threads 50 which require the rotation of the piston rod as it moves into and out of the grease gun, this giving it a slow motion power inside the gun which would not be present if the screw threads were omitted and the device merely reciprocated like an ordinary piston rod. The end of the piston rod 46 which is inside the grease gun carries a metal piston 52—54 clamping a leather plunger 56, having a cylindrical flange 58 with its free edge toward the discharge end of the grease gun. The right hand end of the gun case is provided with an enlarged cylindrical portion 62 having external screw threads 64 which are engaged by the cap 44, heretofore referred to. This enlarged cylindrical portion 62 is made of a suitable length and of a suitable clearance 60 so that when the cap 44 and the attached piston and piston rod mechanism are removed from the grease gun, there is ample space 60, as shown, so that on starting to replace these piston parts, after filling the grease gun, the flange 58 will readily enter this clearance space 60, as shown in Figure 3, and be clear of the interior wall of the grease gun case until the cap 44 is in place and the operator has rotated handle 48 to move the member 56 a substantial distance to the left from the position shown in Figure 3. This structure avoids all trouble now common in the art which ordinarily occurs in applying a grease gun piston to the open end of a grease gun case after filling the latter.

In order to assist the nozzle tip 24 in positioning itself in the discharge port 26 of the grease cup, the fit of the screw threads 32 on the pipe 30 and the cap 34 may, if desired, be made sufficiently loose to allow slight lateral play of the pipe 30 and, consequently, the nozzle with reference to the central axis of the grease cup.

Having thus described my invention, what I claim as new and desire to secure by Letters Patent is:

1. In a force feed lubricating device, a nozzle insertable within a grease cup in position to deliver lubricant through the discharge orifice of said cup and with its bore closed against communication with the interior of said cup, and means for connecting the cup and nozzle operable when said connection is effected to force and hold the nozzle in said position within the cup.

2. In a force feed lubricating device, a conduit including a nozzle at one end and means at its other end for attachment to a grease gun, said nozzle being insertable within a grease cup in position to deliver lubricant through the discharge orifice of said cup with its bore closed against communication with the interior of said cup, and means having thread connection with the conduit and adapted for thread connection with the cup operable, when the thread connection between said means and cup is effected, to force and hold the nozzle in said position within the cup.

In witness whereof, I have hereunto subscribed my name.

GUSTAV ADOLF FRAUENFELDER.